(12) United States Patent
Matsui et al.

(10) Patent No.: US 6,464,771 B1
(45) Date of Patent: Oct. 15, 2002

(54) CURED CALCIUM SILICATE OBJECT WITH HIGH STRENGTH

(75) Inventors: Kunio Matsui; Tadashi Shimizu, both of Fuji (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/622,834

(22) PCT Filed: Feb. 22, 1999

(86) PCT No.: PCT/JP99/00777

§ 371 (c)(1),
(2), (4) Date: Aug. 23, 2000

(87) PCT Pub. No.: WO99/42418

PCT Pub. Date: Aug. 26, 1999

(30) Foreign Application Priority Data

Feb. 23, 1998 (JP) .......................................... 10-040021

(51) Int. Cl.⁷ .............................................. C04B 28/18
(52) U.S. Cl. ...................... 106/470; 106/796; 106/797; 264/333
(58) Field of Search ................................ 106/470, 796, 106/797; 264/333

(56) References Cited

U.S. PATENT DOCUMENTS 3,988,419 A * 10/1976 Mori
4,298,561 A    11/1981 Uchida et al.
4,574,012 A *  3/1986 Oguri et al.
5,240,501 A *  8/1993 Popovic ...................... 106/792
5,242,649 A *  9/1993 Yammamoto et al. ...... 264/333
5,330,573 A *  7/1994 Nakano et al. ............. 106/796
5,580,508 A * 12/1996 Kabayashi et al. ......... 264/234
6,139,620 A * 10/2000 Suzuki et al. ............... 106/672

FOREIGN PATENT DOCUMENTS

| JP | 05-124877 | 5/1993 |
| JP | 05-213657 | 8/1993 |
| JP | 07-041354 | 2/1995 |

* cited by examiner

Primary Examiner—Paul Marcantoni
(74) Attorney, Agent, or Firm—Pennie & Edmonds LLP

(57) ABSTRACT

The invention relates to a hardened calcium silicate material characterized by having Ib/Ia which is greater than 3 (wherein Ib represents the diffraction peak intensity of the tobermorite (220) plane in powdery X-ray diffractometry; and Ia represents the minimum diffraction intensity in the angle region located between two diffraction peaks in the tobermorite (220) and (222) planes;), having a specific gravity of 0.2 or more but less than 0.7, and being substantially free from bubbles having a maximum diameter exceeding 200 $\mu$m; and a process for producing the same.

5 Claims, 5 Drawing Sheets

5μm

5μm

CURED CALCIUM SILICATE OBJECT WITH HIGH STRENGTH

TECHNICAL FIELD

This invention relates to a hardened calcium silicate material which is lightweight and has a high strength and a high durability and a process for producing the same.

BACKGROUND ART

With the recent demand for lightweight buildings, there have been required incombustible and lightweight building materials. As such building materials, autoclaved lightweight concretes (ALCs) and fiber-reinforced calcium silicate board have been generally employed. Autoclaved lightweight concretes are produced by using cement and powdery silica as the main materials optionally together with quick lime powder, gypsum, etc., adding water thereto to give a slurry, molding the slurry in a formwork, and then curing it in an autoclave. Because of being lightweight (i.e., having a specific gravity of about 0.5 to 0.6) and containing a large amount of tobermorite ($5CaO.6SiO_2.5H_2O$) having a high crystallinity, these autoclaved lightweight concretes are excellent in long-term weatherability. Thus, they are widely employed as exterior wall materials, floor materials and interior wall materials in buildings.

The compressive strength of these autoclaved lightweight concretes ranges from 40 to 50 $kgf/cm^2$. On the other hand, these materials have a low flexural strength, which is an important physical factor as a panel, of about 10 $kgf/cm^2$. Thus, steel bars are provided within autoclaved lightweight concretes for reinforcement to thereby secure the design strength. The need of providing the steel bars restricts the production of autoclaved lightweight concretes in several points. That is to say, such an material should have a thickness of at least 50 mm, which brings about an increase in the weight per unit area in practice. There arises another problem that materials in a complicated shape can be hardly manufactured. Moreover, autoclaved lightweight concretes contain a large number of bubbles of about 1 mm in diameter, which cause another serious problem of being brittle and poor in processability (for example, surface smoothness and sawing properties).

Therefore, attempts have been made to improve the strength of autoclaved lightweight concretes by, for example, regulating the bubble size distribution, elevating the ratio of closed cells, or elevating the tobermorite crystallinity. However, none of these attempts can establish sufficient results so far. Further, JP-A-7-101787 discloses a technique relating to ALC which is made lightweight without resort to bubbles, and reports a building material having a compressive strength exceeding 200 $kgf/cm^2$ (the term "JP-A" as used herein means an "unexamined published Japanese patent application") However, this method can give a specific gravity of 0.7 at the lowest, which is still insufficient as a lightweight building material.

On the other hand, fiber-reinforced calcium silicate board is produced by reacting crystalline or amorphous silicate with lime and then hardening together with reinforcing fiber in an autoclave. Uses of the fiber-reinforced calcium silicate board are roughly classified into heat insulating materials having a specific gravity of 0.3 or less, flame-resistant coating materials having a specific gravity of 0.3 to 0.4 and flame-resistant building materials having a specific gravity of 0.6 to 1.2. For molding, the filter press method is used in case where specific gravity is 0.4 or less, while the fabrication method is used in case where specific gravity is 0.6 or more. Hardening reaction is carried out with the use of an autoclave in each case. The hardened materials contain, as the main components, tobermorite, xonotlite, low-crystalline calcium silicate hydrate (tobermorite gel or CSH gel, hereinafter referred to simply as CSH) and the like, in addition to the fiber.

Because of containing a large amount of fiber (5 to 20% by weight), this fiber-reinforced calcium silicate boards are excellent in flexural strength and toughness and show a high processability. However, the boards have a high water absorptivity and a high drying shrinkage ratio, which makes them poor in dimensional accuracy. The boards have additional problems; for example, there are a lot of dust falling off from the boards and, frequently there are flaws on the board, which are caused by the insufficient hardness of the surface of the boards. Moreover, fiber-reinforced calcium silicate board containing CSH as the main component is poor in weatherability and durability. Since use of the fiber-reinforced calcium silicate board as an exterior building material is restricted by these problems, they are mainly employed as building materials for interior use. For example, Japanese Patent No. 2514734 discloses a technique relating to a molded calcium silicate material composed of tobermorite, CSH, quartz and reinforcing fiber and reports a building material having a specific gravity of 0.55 and a flexural strength of 100 $kgf/cm^2$ or more. In this method, a silicate material and a lime material are brought into contact at a temperature of 50° C. or below to thereby elevate the tobermorite content in the molded material. However, the tobermorite in the molded calcium silicate material produced by this method has a very low crystallinity, compared with tobermorite generally observed in autoclaved lightweight concretes. Thus, the molded calcium silicate material has only an insufficient weatherability, in particular, resistance against neutralization due to carbon dioxide in the atmosphere, which makes it unusable as an exterior building material.

An object of the invention is to provide a hardened calcium silicate material which is lightweight (i.e., having a specific gravity of 0.2 or more but less than 0.7) but has a strength adequate for building materials without resort to any reinforcements such as steel bars, a long-term durability owing to its high crystallinity and an excellent processability such as a high surface smoothness and excellent sawing properties.

DISCLOSURE OF THE INVENTION

The inventors paid attention to the $CaO/SiO_2$ ratio at the early stage of the reaction of starting materials, conducted intensive studies, and thereby completed the invention.

Accordingly, the invention relates to the follows.

(1) A hardened calcium silicate material characterized by having Ib and Ia, wherein a ratio of Ib to Ia is greater than 3, (wherein Ib represents the diffraction peak intensity of the tobermorite (220) plane in powdery X-ray diffractometry; and Ia represents the minimum diffraction intensity in the angle region located between two diffraction peaks in the tobermorite (220) and (222) planes;), having a specific gravity of 0.2 or more but less than 0.7, and being substantially free from bubbles having a maximum diameter which is greater than 200 μm.

(2) The hardened calcium silicate material as described in the above (1) characterized in that the specific surface area measured by the nitrogen adsorption method is 60 $m^2/g$ or less.

(3) The hardened calcium silicate material as described in the above (1) or (2) characterized in that, among tobermorite diffraction peaks observed in powdery X-ray diffractometry, the ratio of the diffraction peak intensity I(002) of the (002) plane to the diffraction peak intensity I(220) of the (220) plane, i.e., I(002)/I (220) is 0.22 or more.

(4) The hardened calcium silicate material as described in any of the above (1) to (3) characterized in that, among pores measured by mercury porosimetry, the ratio of pores having a pore size of 1.0 µm or more is from 1% by volume to 15% by volume (inclusive).

(5) A process for producing the hardened calcium silicate material as described in any of the above (1) to (4) characterized in that it comprises mixing a primary material and a secondary material in a slurry state, preliminarily hardening the obtained slurry at 40° C. or above, and then curing in an autoclave at 160° C. or above. The primary material is obtained by mixing a silicate material, a lime material and water, as the main component, at 40° C. or above in such a manner as to give a $CaO/SiO_2$ molar ratio of from 1.2 to 2.5. The secondary material contains at least one of a silicate material and a lime material or at least one of a silicate material and a lime material together with water, as the main component, in such a manner as to give a $CaO/SiO_2$ molar ratio after mixing of from 0.6 to 1.5, a weight ratio of water to the total solid weight of from 1.0 to 5.0, and an amorphous silicate material content in the silicate materials of less than 20% by weight.

The invention is based on the findings that a hardened calcium silicate material having a low specific gravity can be obtained without resort to any foaming agents by mixing under definite conditions and then reacting a primary material, which is obtained by blending and reacting a silicate material, a lime material and water, as the main component, to give a $CaO/SiO_2$ ratio within a definite range, and a secondary material selected from the same material species; and that such a hardened calcium silicate material contains a large amount of highly crystalline tobermorite and has a microstructure different from the conventional ones.

The invention is also based on the findings that these hardened calcium silicate materials show a strength several times higher than conventional autoclaved lightweight concretes while sustaining the high durability thereof, a largely improved cutout resistance which is one of the shortages of the conventional autoclaved lightweight concretes, and a high processability; and that these hardened calcium silicate materials are superior also in compressive strength and durability to the conventional fiber-reinforced calcium silicate board.

BEST MODE FOR CARRYING OUT THE INVENTION

Figure 1A:
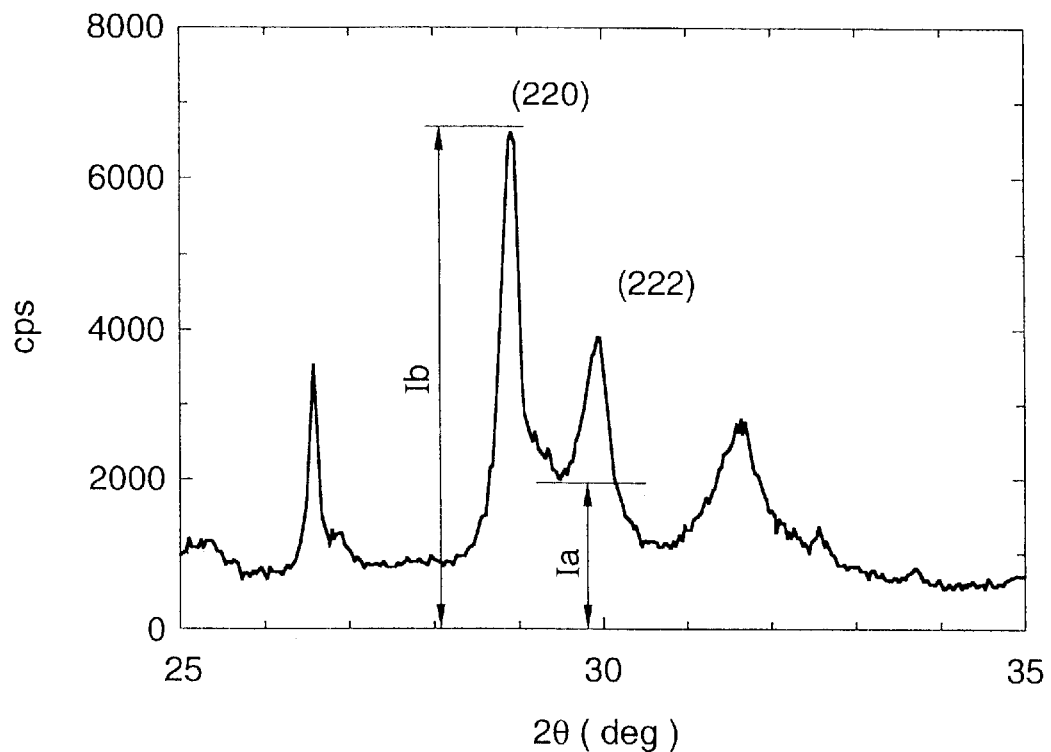
FIG. 1A illustrates how to calculate Ia and Ib in powdery X-ray diffractometry of the hardened calcium silicate material produced by the process described in Example 1.

Now, the invention will be described in greater detail.

It is preferable that the hardened calcium silicate material according to the invention contains tobermorite as the main component. Tobermorite, which is one of typical calcium silicate hydrates usually observed in autoclaved lightweight concrete (ALC) and the like, is in the form of plate or strip particles. It can be judged whether tobermorite serves as the main component or not by observing a cut surface of the hardened calcium silicate material using a scanning electron microscope and powdery X-ray diffractometry. That is to say, no other diffraction peak exceeding the (220) diffraction peak of tobermorite is observed in powdery X-ray diffractometry. In case where a small amount of highly crystalline substance (oxides such as crystalline silica, sulfates or carbonates such as gypsum dihydroxide and gypsum anhydride) exists together with tobermorite, it is sometimes observed that the most intense diffraction peak of such a coexisting substance exceeds the (220) diffraction peak of tobermorite because of its high crystallinity, even though tobermorite serves as the main component. In such a case, if it can be judged under a scanning electron microscope that the structure is mainly composed of plate or strip particles, then it is exceptionally regarded that tobermorite is the main component of this structure. The term "plate or strip particles" as used herein means particles which have at least a couple of planes; the couple of planes have the largest area among planes constituting a single particle and are almost parallel to each other and the maximum particle length of which is 5 times or more as long as the distance between these planes forming a couple. Needless to say, the maximum length means the two-dimensionally projected length. Although these tobermorite particles are not restricted in size, the maximum length thereof preferably ranges from several to 10 µm.

In general, tobermorite exists together with CSH in many cases. It is known that CSH occurs in various particle forms. CSH particles can be distinguished from tobermorite particles under an electron microscope exclusively in case where they are in the form of fibers, grains or masses. Although the hardened calcium silicate material of the invention may contain such CSH so long as the microstructure constituting of tobermorite particles is not deteriorated thereby, it is favorable to minimize the CSH content. This is because CSH worsens various properties of building materials, as will be described hereinafter. The hardened calcium silicate material of the invention may further contain a small amount of lightweight aggregates, reinforcing fibers, pulp, resins, etc., so long as the microstructure constituting of tobermorite particles is not deteriorated thereby.

In the hardened calcium silicate material of the invention, the ratio (Ib/Ia) is more than 3, wherein Ib represents the tobermorite (220) diffraction peak intensity observed in powdery X-ray diffractometry; and Ia represents the minimum diffraction intensity in the angle region located between two tobermorite diffraction peaks (220) and (222). The term "powdery D-ray diffractometry" as used herein means a diffraction apparatus with the use of CuKα-ray as the X-ray. When the hardened calcium silicate material contains much CSH, it suffers from a decrease in dimensional stability after repeated drying/moistening. When allowed to stand in the atmosphere over a long time, CSH easily reacts with carbon dioxide in the atmosphere and thus decomposes into calcium carbonate and amorphous silicate, i.e., the carbonization reaction. Since this reaction is accompanied by a shrinkage in volume, the hardened calcium silicate material undergoes cracking and deterioration. In case of having a specific gravity less than 0.7, the hardened calcium silicate material has an air-permeability of a certain extent, and thus the carbonization reaction is liable to proceed into the inner parts. This is a fetal defect when the hardened calcium silicate material is to be used as an exterior building material. When a hardened material containing tobermorite together with CSH is analyzed by powdery X-ray diffractometry, a relatively broad diffraction peak of CSH is observed in a region located between the tobermorite (220) and (222) diffraction peaks. This diffraction peak usually appears at around 29.1 to 29.4° (2θ). When CSH is contained in a smaller amount than tobermorite, the diffraction intensity of CSH cannot be measured usually. Since the X-ray diffraction intensity in the region located between the tobermorite (220) and (222) diffraction peaks is higher than the base line in such a case, the presence/absence of CSH can be judged. In case where the hardened calcium silicate material is free from CSH and contains highly crystalline tobermorite as the main component, the minimum X-ray intensity in the above-described region is equal to the background intensity. That is to say, the larger (Ib/Ia) ratio (wherein Ib represents the tobermorite (220) diffraction peak intensity while Ia represents the minimum diffraction intensity in the angle region located between two tobermorite diffraction peaks (220) and (222)) indicates the smaller CSH content in the hardened calcium silicate material.

Figure 1B:
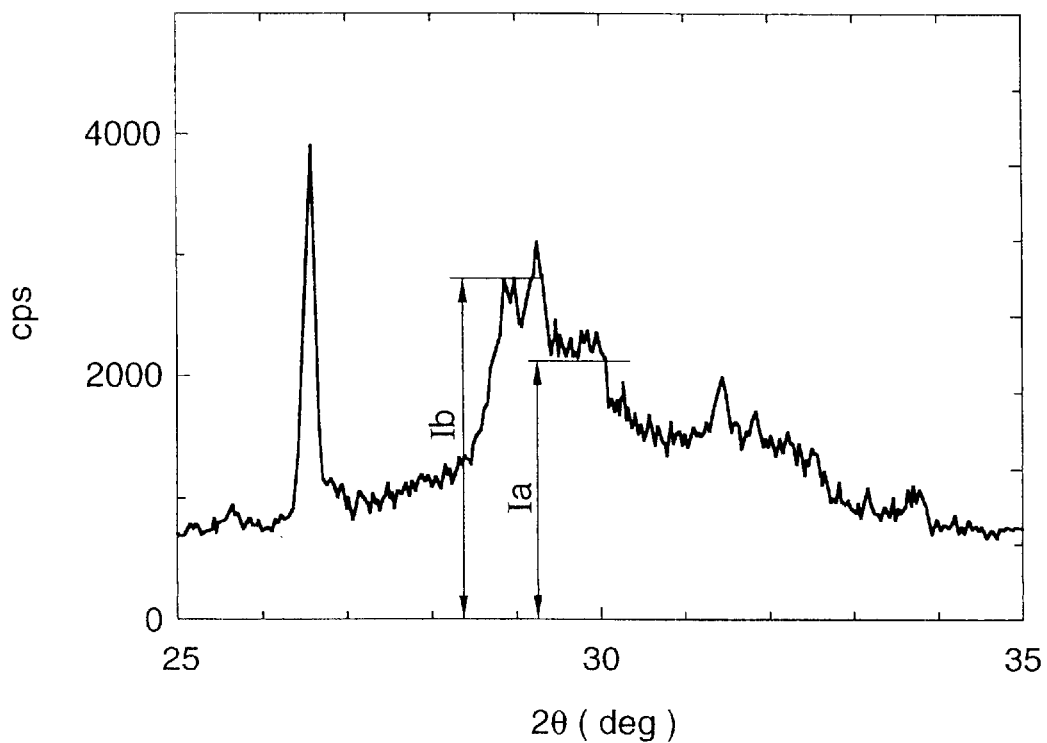
FIG. 1B illustrates how to calculate Ia and Ib in powdery X-ray diffractometry of the hardened calcium silicate material produced by the process described in Comparative Example 1.

When tobermorite has a low crystallinity, on the other hand, the Ib/Ia ratio becomes smaller even in case where no CSH is contained. This is because the diffraction peaks (220) and (222) are located closely to each other and thus overlap at the base parts. When the tobermorite crystallinity is lowered, the strength and weatherability of the hardened calcium silicate material are worsened. Therefore, it is preferable in each case that the Ib/Ia ratio is more than 3, still preferably more than 4 and still preferably more than 5. Less reactive silica sources are employed in commercially available autoclaved lightweight concretes to elevate the crystallinity of tobermorite and, in turn, elevate the Ib/Ia ratio. These autoclaved lightweight concretes have low strength in spite of the high Ib/Ia ratio. This is because they contain large bubbles, as described above. The intensities Ia and Ib are values each involving the background intensity. Namely, they are calculated by a method different from the method employed for calculating I(002) and I(220) as will be described hereinafter. FIGS. 1A and 1B show how to calculate Ia and Ib.

It is preferable that the hardened calcium silicate material of the invention has a number of voids, among plate or slip tobermorite particles, having a diameter comparable to or less than the maximum length of these particles. One of the characteristics of the hardened calcium silicate material of the invention resides in that lightening can be established mainly due to these voids among particles. Owing to this structure, the hardened calcium silicate material of the invention can show a high compressive strength and a high flexural strength while sustaining a high cutout resistance and a good processability with the use of little reinforcing fiber, etc.

The specific gravity of the hardened calcium silicate material of the invention is 0.2 or more but less than 0.7, preferably 0.3 or more but less than 0.7 and still preferably 0.4 or more but less than 0.7. The term "specific gravity" as used herein means the specific gravity determined on the basis of the equilibrium weight at 105° C., namely, the absolute dry specific gravity. When the specific gravity is less than 0.2, the high strength aimed in the invention cannot be achieved.

The hardened calcium silicate material according to the invention is characterized by being substantially free from bubbles having a maximum diameter which is greater than 200 μm. The term "bubbles" as used herein means large spherical voids formed by gas enclosed in the step of mixing the starting materials or in the preliminary hardening step. These bubbles are usually in the spherical, ellipsoid or droplet shape and bonded to each other. Thus, they can be easily distinguished from voids formed by cracking or cutout or fine voids of 10 μm or less in size. The fact that the hardened calcium silicate material of the invention is substantially free from bubbles having a maximum diameter exceeding 200 μm means that, when the hardened calcium silicate material is broken, not more than 20 bubbles having a maximum diameter which is greater than 200 μm are observed in a section face of 10 mm×10 mm. The term "maximum diameter" as used herein means the maximum length of bubbles observed on the section which are in the spherical, ellipsoid or droplet shape or bonded to each other. These bubbles can be easily observed by using a stereoscopic microscope or the like. Conventional autoclaved lightweight concretes are lightened by introducing bubbles of 100 μm to 1 mm in diameter, thus being remarkably different in structure from the hardened calcium silicate material of the invention. Because of being substantially free from bubbles having a maximum diameter which is greater than 200 μm, the hardened calcium silicate material of the invention can exert a high strength which has never been achieved by the conventional autoclaved lightweight concretes.

It is preferable that the hardened calcium silicate material of the invention has a specific surface area measured by the nitrogen adsorption method (BET method) of 60 m$^2$/g or less. The specific surface area of tobermorite is lessened with an increase in the crystallinity. It is reported that highly crystalline tobermorite has a specific surface area of from 40 to 50 m$^2$/g ("Sekko to Sekkai", No. 124, p. 129 (1988)). According to this document, CSH has a very large specific area of 200 to 250 m$^2$/g. Namely, the specific surface area can be considered as an indication depending on the crystallinity of tobermorite and the content of CSH. Thus, it can be regarded as one physical factor expressing the performance of building materials containing tobermorite. Accordingly, a specific surface area exceeding 60 m$^2$/g means a decrease in the tobermorite crystallinity or an increase in the CSH content. In such a case, therefore, the strength of the hardened material is lowered and, at the same time, the performance as a building material typified by weatherability and dimensional stability is worsened. Thus, it is preferable that the hardened calcium silicate material according to the invention has a specific surface area measured by the nitrogen adsorption method (BET method) of 60 m$^2$/g or less, still preferably 50 m$^2$/g or less. A significant decrease in the specific surface area means that the hardened calcium silicate material is contaminated with a large amount of substances having small specific surface area other than tobermorite. It is therefore favorable that the specific surface area of the hardened calcium silicate material is at least 20 m$^2$/g.

Figure 2:
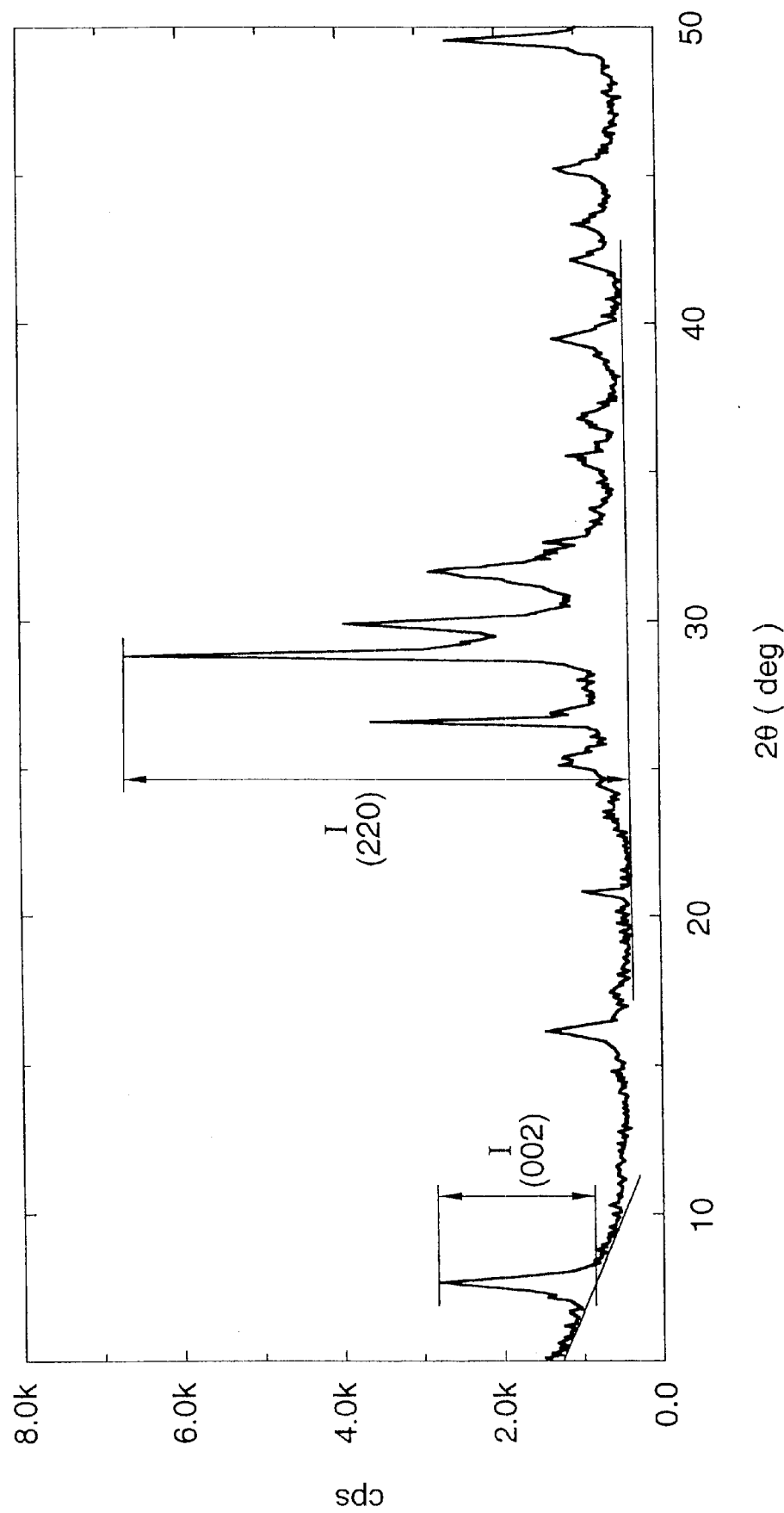
FIG. 2 illustrates how to calculate I(002) and I(220) in powdery X-ray diffractometry in Example 1.

It is preferable that, in the hardened calcium silicate material of the invention, the ratio of the diffraction peak intensity I(002) of the (002) plane to the diffraction peak intensity I(220) of the (220) plane, i.e., the ratio of I(002) of I(220) is 0.22 or more, among the tobermorite diffraction peaks observed in powdery X-ray diffractometry. In the plate or strip tobermorite particles, the direction perpendicular to the plane (i.e., the thickness direction) is referred to as the C-axis direction of the crystals. Therefore, an increase in the relative intensity of I(002) indicates an increase in the relative regularity in the C-axis direction and, in its turn, an increase in the thickness of the plate crystals. According to JCPD Card No. 19-1364, the ratio the ratio of I(002) to I(220) of ideal tobermorite crystals is 0.8. As the ratio of I(002) to I(220) approximates to this level, the crystal thickness is elevated and the strength of a single crystal is enhanced. As a result, the strength of the hardened material consisting of these crystals is also enhanced. Moreover, an increase in the crystalline regularity contributes to the improvement in the performance (typified by weatherability such as carbonization resistance) as a building material. Therefore, it is preferable that the ratio I(002)/I(220) is 0.22 or more, still preferably 0.25 or more and still preferably 0.35or more. FIG. 2 shows how to calculate I(002) and I(220).

In the hardened calcium silicate material according to the invention, the ratio of pores having a pore size of 1 μm or more, among pores measured by mercury porosimetry, amounts to from 1% by volume to 15% by volume (inclusive). It is preferable that the ratio of pores having a pore size of 0.5 μm or more is from 1% by volume to 20% by volume (inclusive). It is still preferable the ratio of pores having a pore size of 0.5 μm or more is from 5% by volume to 45% by volume (inclusive). It is furthermore preferable that the ratio of pores having a pore size of 0.1 μm or more is from 5% by volume to 40% by volume (inclusive).

The mercury porosimetry means a method wherein mercury is injected into a hardened calcium silicate material to measure the pore size distribution based on the relation between the pressure at the injection and the amount of the injected mercury. In this method, calculation is made on the assumption that pores have a cylindrical shape. Accordingly, the data obtained by this method are not considered as showing the actual pore sizes but employed as an indication of the void size among components. In case where the ratio of pores having a diameter of 1 μm or more, determined by this method, is greater than 15% by volume, the strength of the hardened material is lowered. In this case, moreover, vigorous moisture migration arises due to the capillary phenomenon and thus the performance as a building material is worsened. By using the present production method, the lower limits of the ratios of pores having a diameter of 1.0 μm or more and pores having a diameter of 0.5 μm or more are each 1% by volume, while the lower limit of the ratio of pores having a diameter of 0.1 μm or more is 5% by volume.

Next, a process for producing the hardened calcium silicate material of the invention will be described in detail.

The hardened calcium silicate material of the invention is obtained by mixing a primary material and a secondary material in a slurry state, preliminarily hardening the obtained slurry at 40° C. or above, and then curing in an autoclave at 160° C. or above. The primary material is obtained by mixing and reacting a silicate material, a lime material and water, as the main component, in such a manner as to give a CaO/SiO$_2$ molar ratio of from 1.2 to 2.5. The secondary material contains at least one of a silicate material and a lime material or at least one of a silicate material and a lime material together with water, as the main component, in such a manner as to give a CaO/SiO$_2$ molar ratio after mixing of from 0.6 to 1.5, a weight ratio of water to the total solid weight of from 1.0 to 5.0, and an amorphous silicate material content in the silicate materials of less than 20% by weight.

The term "preliminarily hardened material" as used herein means a hardened matter, which is obtained after mixing the primary and secondary materials, before curing in an autoclave.

The term "silicate material" as used herein means a material containing 50% by weight or more of SiO$_2$. Examples thereof include crystalline silica, silica sand, rocks with a high quartz content, etc., natural clay minerals such as diatomaceous earth, fumed silica, fly ash, kaolin clay, montmorillonite clay, etc. and baked products thereof. Among these silicate materials, an amorphous silicate material means one showing no obvious diffraction peak in powdery X-ray diffractometry (diatomaceous earth, fumed silica, fly ash, etc.). In addition to these amorphous silicate materials, natural clay minerals (kaolin clay, montmorillonite clay, bentonite, etc.) and baked products thereof, each showing an inherent diffraction peak but having a low reactivity, also fall within the category of the amorphous silicate material herein.

In contrast, silica, silica sand, etc. frequently show a sharp diffraction peak assignable to α-quartz usually in powdery X-ray diffractometry.

The term "lime material" as used herein means a material containing 50% by weight or more of CaO in terms of oxide. Examples thereof include quick lime and slaked lime. In addition, cements containing calcium as the main component (namely, ordinary portland cement, high-early-strength portland cement, berite cement and various alumina cements) also fall within the category of the lime material.

To preliminarily harden the slurry before the autoclave treatment within the scope of the water/solid ratio as defined in the invention, it is favorable that the silicate material has a high reactivity. The presence of a large amount of unreacted matters remaining in the hardened calcium silicate material worsens the cutout resistance and thus lowers the strength. It is, therefore, favorable to use a highly reactive silicate material or a finely ground one. For example, it is preferable to use a silicate material having a fineness measured on the basis of Blaine specific surface area of 3,000 cm$^2$/g or more, still preferably 7,000 cm$^2$/g or more. However, an excessively high fineness is undesirable from the viewpoints of managing and handling the material. Thus, the silicate material preferably has a fineness, measured on the basis of Blaine specific surface area, of not more than 300,000 cm$^2$/g. Among the silicate materials, amorphous silicate materials have high reactivity compared with crystalline silicate materials.

It is known that, when such a silicate material in the form of a fine powder or an amorphous silicate material is employed, CSH is easily formed at a CaO/SiO$_2$ molar ratio of about 1 in the step of reacting the silicate material with a lime material in the presence of water even at ordinary temperature. Moreover, it is a common knowledge in the art that CSH, which is a highly stable substance, is hardly converted into tobermorite even by curing at a high temperature under a high pressure in the subsequent stage.

However, the inventors have found out for the first time that, when a primary material is obtained by blending these materials at a $CaO/SiO_2$ molar ratio of from 1.2 to 2.5 and contacting with water over a definite period or longer, and is mixed with a secondary material having a lower $CaO/SiO_2$ molar ratio so as to give a $CaO/SiO_2$ molar ratio after mixing of from 0.6 to 1.5, then, such stable CSH as described above is not formed even by using a highly reactive silicate material, and tobermorite having a higher crystallinity can be formed in a large amount by the subsequent curing treatment at a high temperature under a high pressure.

That is to say, the primary material is obtained by mixing and reacting a silicate material, a lime material and water, as the main component, in such a manner as to give a $CaO/SiO_2$ molar ratio of from 1.2 to 2.5. The reaction is carried out for at least 10 minutes, preferably at least 30 minutes. The crystallinity of tobermorite in the final hardened material is lowered as this treatment time is prolonged. Therefore, it is favorable that the obtained mixture is employed as the primary material within 24 hours. After the completion of the reaction, the primary material may be either in the form of a slurry or in a hardened state.

Although the primary material may be formed at an arbitrary temperature without restriction, the temperature immediately after mixing is usually 40° C. or above, preferably from 40 to 100° C. When the $CaO/SiO_2$ molar ratio is less than 1.2, stable CSH is formed in this step and the formation of tobermorite in the subsequent stage is inhibited, as described above. When the $CaO/SiO_2$ molar ratio is greater than 2.5, calcium hydroxide crystals are momentarily formed in the reaction system and thus Ca in the aqueous solution is consumed. As a result, the $CaO/SiO_2$ molar ratio participating in the reaction becomes less than 1.2 and thus stable CSH is formed in a large amount, similar to the above-described case.

Therefore, it is necessary that the $CaO/SiO_2$ molar ratio falls within a range of from 1.2 to 2.5, preferably from 1.5 to 2.0. The primary material can optionally contain gypsum (gypsum dihydroxide, gypsum hemihydrate, gypsum anhydride), reinforcing fibers, thickeners, aggregates, etc. The amount of the water to be used in forming the primary material is not particularly restricted, so long as the weight ratio of the total amount of water employed to the total weight of the silicate materials, lime materials and other solid materials to be used in the primary and secondary materials falls within the range of from 1.0 to 5.0. With respect exclusively to the primary material, it is preferable that the weight ratio of the water to the total weight of the silicate material, the lime material and other solid materials to be used in the primary material is 0.7 or more, still preferably 1.0 or more and still preferably 1.5 or more.

To mix the powdery materials and water for the primary material, use can be made of a mixer usually employed in the art. More particularly speaking, for example, the powdery materials for the primary material are added to the water for the primary material heated to 70° C. by using a stirrer provided with high-speed rotational blades for low-viscosity mortars and then mixed. After adding the above-described materials for the primary material, the mixture is agitated at 1,200 rpm for 1 minute under the atmosphere while heating the mixing tank to 60° C. It is still preferable to agitate the mixture under reduced pressure. Namely, the mixture is agitated for 3 minutes at 1,200 rpm under reduced pressure of 200 mmHg or less while heating the mixing tank to 60° C. Agitation under reduced pressure makes it possible to reduce bubbles formed by gas incorporation during the agitation. The agitation may be carried out not in the atmosphere but under an inert gas such as nitrogen.

The primary material thus obtained is mixed, as such in case of being in the form of a slurry or after grinding in case of having been hardened, with the secondary material. In this step, it is necessary that the $CaO/SiO_2$ molar ratio after mixing is from 0.6 to 1.5, preferably from 0.7 to 1.2 and still preferably from 0.7 to 0.95. When this ratio is less than 0.6, the unreacted silicate material remains in a large amount and thus the amount of the tobermorite product is reduced. When this ratio exceeds 1.5, the amount of the tobermorite product is considerably reduced. To regulate the $CaO/SiO_2$ molar ratio within the range as defined above, it is needed that the $CaO/SiO_2$ molar ratio of the secondary material is lower than that of the primary material.

The primary material and the secondary material is mixed so that a ratio of (weight of primary material) to (weight of primary material+weight of powdery components in secondary material) becomes preferably from 0.2 to 0.97, more preferably from 0.30 to 0.95, and a ratio of (weight of powdery components in primary material) to (weight of powdery components in primary material+weight of powdery components in secondary material) becomes preferably from 0.15 to 0.85, more preferably from 0.2 to 0.8. The term "weight of primary material" as used herein means the weight involving water, while the term "powdery components" means solid materials excluding reinforcing fiber. When the mixing ratio of these materials is excluded from the range as defined above, there arises a tendency toward the formation of stable CSH and thus the content and crystallinity of tobermorite can be hardly elevated.

Similar to the primary material, the secondary material can optionally contain gypsum, reinforcing fibers, thickeners, aggregates, etc. It has been found out for the first time by the inventors that the carbonization resistance of the hardened calcium silicate material can be elevated by adding gypsum to the secondary or primary material. It is, therefore, preferable to add from 0.5 to 10% by weight (inclusive), still preferably from 1 to 6% by weight (inclusive) and still preferably form 2 to 5% by weight (inclusive), of gypsum based on the total materials excluding water. As the gypsum, it is favorable to use gypsum dihydrate ($CaSO_4.2H_2O$)

As the reinforcing fiber, various organic and inorganic fibers can be used. Pulp is favorably employed among organic fibers, since it is inexpensive and hardly deteriorated in an autoclave. Either soft wood pulps or hard wood pulps and either virgin pulps or reclaimed pulps are usable therefor. These pulps are also efficacious as thickeners and dispersion stabilizers. It is preferable to use microfibrillated cellulose. Although these reinforcing fibers contribute to the improvement in the flexural strength, they cause a decrease in the surface hardness typically expressed by the compressive strength and dust falling-off. Moreover, addition of an excessively large amount of a reinforcing fiber worsens the flame resistance. Therefore, it is preferable to add such a reinforcing fiber in an amount of from 0.5 to 6% by weight (inclusive), still preferably from 0.5 to 5% by weight (inclusive) and still preferably from 0.5 to 4% by weight (inclusive), based on the total materials excluding water.

Gypsum, reinforcing fibers, thickeners, aggregates, etc. may be added either in the step of producing the primary material or together with the secondary material.

Alternatively, these components may be added either to the primary material or to the secondary material. By taking easiness in mixing into consideration, it is favorable to add these components together with the secondary material.

The primary material is mixed with the secondary material in a slurry state so that a weight ratio of water to the total weight of the silicate materials, lime materials and other solid materials employed becomes from 1.0 to 5.0. This means that the weight ratio expressed as (water employed in preparing primary material+water added in preparing secondary material)/(weight of solid components in primary material+weight of solid components in secondary materials) falls within a range of from 1.0 to 5.0. When this weight ratio is excluded from this range, the specific gravity as defined in the invention cannot be achieved. To obtain a hardened calcium silicate material having a high strength and a low specific gravity, it is preferable that this ratio falls within a range of from 1.5 to 4.0.

Further, the amount of the amorphous silicate material employed is regulated so as to give an amorphous silicate material content in the total silicate materials of less than 20% by weight. Because of having a high reactivity and an effect of preventing sedimentation of solid matters in a slurry having high water/solid ratio, an amorphous silicate material serves as one of useful components in case where the specific gravity is less than 0.5. However, amorphous silicate materials have a tendency to form CSH due to its high reactivity and thus inhibit the achievement of a high tobermorite crystallinity, as described above. When the ratio of the amorphous silicate material to the total silicate materials is high, the formation of CSH cannot be inhibited even in the two-stage reaction according to the invention. Therefore, it is preferable that the content of the amorphous silicate material in the total silicate materials is less than 20% by weight, still preferably less than 15% by weight. To reduce CSH, it is favorable that the amorphous silicate material is employed in the primary material.

Similar to the mixing of the primary material, the mixing may be carried out by using an arbitrary mixer. The slurry thus prepared is preferably casted into a formwork and molded as such. The molded material thus obtained is preliminarily hardened usually at 40° C. or above, preferably from 40 to 100° C., for 3 hours or longer. The preliminarily hardened material thus obtained is cut into a desired shape, if needed, and then cured at a high temperature under a high pressure by using an autoclave. For cutting, use may be made of the wire-cutting method generally employed in the production of autoclaved lightweight concretes. Autoclaving is performed usually at 160° C. (gauge pressure: about 5.3 kgf/cm$^2$) or above, preferably from 160° C. to 220° C. (gauge pressure: about 22.6 kgf/cm$^2$). The resultant hardened material is dried to give the hardened calcium silicate material according to the invention.

EXAMPLES

Now, the invention will be described in greater detail by referring to the following Examples wherein the following measurement methods were employed.

[Flexural Strength and Compressive Strength]

Measurement was carried out in accordance with the methods for measuring flexural strength and compressive strength in the physical test methods for cement as defined JIS R 5201. Namely, samples (40 mm×40 mm×160 mm) were employed at a span width of 100 mm in measuring flexural strength. To measure compressive strength, a half of a sample broken in the flexural strength test was used and the maximum load was measured on a pressurized plane (40 mm×40 mm) at a distance from the pressurized plane of 40 mm. In case of a sample in the form of a board, two or three pieces were bonded together and a cubic sample was cut therefrom and employed as a test sample. In this case, the compression strength was measured in at least three directions orthogonal to each other and the average was determined. The drying conditions are as follows. A hardened material was placed in a dryer at 70° C. and then cooled to room temperature at the point the moisture content reached 10±2%, based on the absolute dry state of the hardened material.

[Specific Gravity]

Hardened materials of the same size as those employed in the flexural strength test were dried at 105° for 24 hours and the specific gravity was calculated from the weight and size at this point.

[Observation of Bubble Size]

The broken section of each sample subjected to the flexural strength test was observed under a stereoscopic microscope (sz, manufactured by Olympus Optical Co., Ltd.) 40×magnification and bubbles having a maximum diameter of 200 µm or more existing in an area (10 mm×10 mm) were counted.

[Pore Size Distribution Measured by Mercury Porosimetry]

After grinding and classifying hardened materials, the 2 to 4 mm fractions were dried at 105° C. for 24 hours to give test samples. The pore size distribution of each sample was measured by using a Pore Sizer 9320 (manufactured by Micormetritics). Calculation was made by referring the contact angle of mercury and the hardened material as 130° and the surface tension of mercury as 484 dyn/cm. The ratio of pores having a pore size of 1 µm or more means the volumetric percentage of pores having a diameter of 1 µm or above, based on the total amount of the pores of from 6 nm to 360 µm in pore size as 100%. The ratio of pores having a pore size of 0.1 µm or more means the volumetric percentage of pores having a diameter of 0.11 µm or above, based on the total amount of the pores of from 6 nm to 360 µm in pore size as to 100%.

[Specific Surface Area Measured by Nitrogen Adsorption Method]

After treating as in the mercury porosimetry, the samples were further dried in vacuo at 70° for 3 hours to give test samples. The specific surface area of each sample was measured by using an Autosorb 1-MP (manufactured by Quantachrome) Measurement was carried out at six points per sample.

[Method for Measuring Blaine Specific Surface Area]

Measurement was carried out in accordance with the method for measuring specific surface area in the physical test methods for cement as defined JIS R 5201.

[Powdery X-ray Diffractometry: Measurement of Ia and Ib]

After subjecting to the strength test, each sample was ground in a mortar and then measurement was carried out by using Cu Kα-ray with an RINT 2000 (manufactured by Rigaku Denki K. K.). The measurement conditions are as follows: accelerating voltage: 40 kV, accelerating current: 200 mA, receiving slit width: 0.15 mm, scanning speed: 4°/minute, and sampling: 0.02°. Diffraction rats were converted into monochromatic rays with a graphite monochromater and then counted. The minimum diffraction intensity involving the background in the angle region located between two tobermorite diffraction peaks (220) and (222) is referred to as Ia, while the maximum intensity of the tobermorite diffraction peak (220) involving the background is referred to as Ib. These two diffraction peaks correspond respectively to diffraction peaks observed around 29.0° and 30.00 (2θ). FIGS. 1A and 1B show model views of the calculation method.

[Powdery X-ray Diffractometry: Measurement of I(002) and I(220)]

The same samples and measurement conditions as in the measurement of Ia and Ib were employed. I(002) is the true diffraction intensity obtained by approximating the background at the diffraction angle of 6 to 9° (2θ) to linearity. Similarly, I(220) is the true diffraction intensity obtained by approximating the background at the diffraction angle of 20 to 40° (2θ) to linearity. The tobermorite (002) diffraction peak corresponds to the diffraction peak observed around 7.70 (2θ). FIG. 2 shows a model view of the calculation method.

[Surface Smoothness]

Evaluation was made by observing the surface conditions with the naked eye.

[Sawing Properties]

A hardened material was cut with a wood saw and evaluation was made on the basis of easiness in sawing and section conditions.

[Carbonization Shrinkage Ratio]

As an indication of long-term durability, the shrinkage ratio in the accelerated carbonization reaction was measured. A test sample (20 mm×40 mm×160 mm) was dried in a thermo-hygrostat at a relative humidity of 60% and a temperature of 20° C. until the weight attained equilibrium. Then it was placed in a neutralization test tank Model BEO610W-6 (manufactured by Asahi Kagaku K. K.). On the days 14 and 28, changes in the distance between marks were measured under a microscope and the shrinkage ratio was calculated in accordance with the formula 1. The neutralization test was carried out at a relative humidity of 60%, a temperature of 20° C. and a carbon dioxide gas concentration of 10% by volume.

Shrinkage ratio $(\%)=[(L_0-L_1)/L_0 \times 100$. Formula 1:

$L_0$: distance between marks at the initiation of neutralization test.

$L_1$: distance between marks on the day 14 or 28 after the initiation of neutralization test.

Examples 1 to 9

Figure 3A:
FIG. 3A. is a scanning electron microscopic photograph of Example 1.

Components for the primary material were mixed at a composition ratio as listed in Table 1 by using a stirrer at 60° C. The resultant slurry was reacted while holding at 60° C. for 4 hours. In Examples 6 and 8, agitation was continued during the reaction. In other examples, agitation was ceased at the end of mixing and the slurry was hardened by allowing to stand. After sampling a portion of the primary material thus obtained, it was mixed in a slurry state with the powdery components of the secondary material and water at a composition ratio as listed in Table 1. In case where the primary material had been hardened, it was once ground and then mixed with the secondary material. Abbreviation of fibers employed in Table 1 are as follows: MFC: microfibrillated cellulose, VP: virgin pulp, RP: reclaimed pulp, and GF: alkali-resistant glass fiber. As the microfibrillated cellulose, use was made of Celish KY-100G manufactured by Daicel Chemical Industries, Ltd. The obtained slurry was poured into a formwork and preliminarily hardened at 60° C. for 8 to 15 hours while regulating the evaporation of water. Next, it was taken out from the formwork and cured in an autoclave at a high temperature of 180° C. under a high pressure for 4 hours and then dried to give a hardened calcium silicate material. Table 3 shows the physical properties of the crystalline silicate materials employed herein. Table 2 shows various physical properties of the hardened calcium silicate materials obtained. When these hardened calcium silicate materials were observed in the section under a scanning electron microscope, each hardened material showed a structure consisting of plate tobermorite particles and a small amount of fibrous particles, as typically shown in FIG. 3A. As the results of powdery X-ray diffractometry, the most intense ray was identified as the tobermorite diffraction (220) ray in each of the hardened materials.

Figure 5:
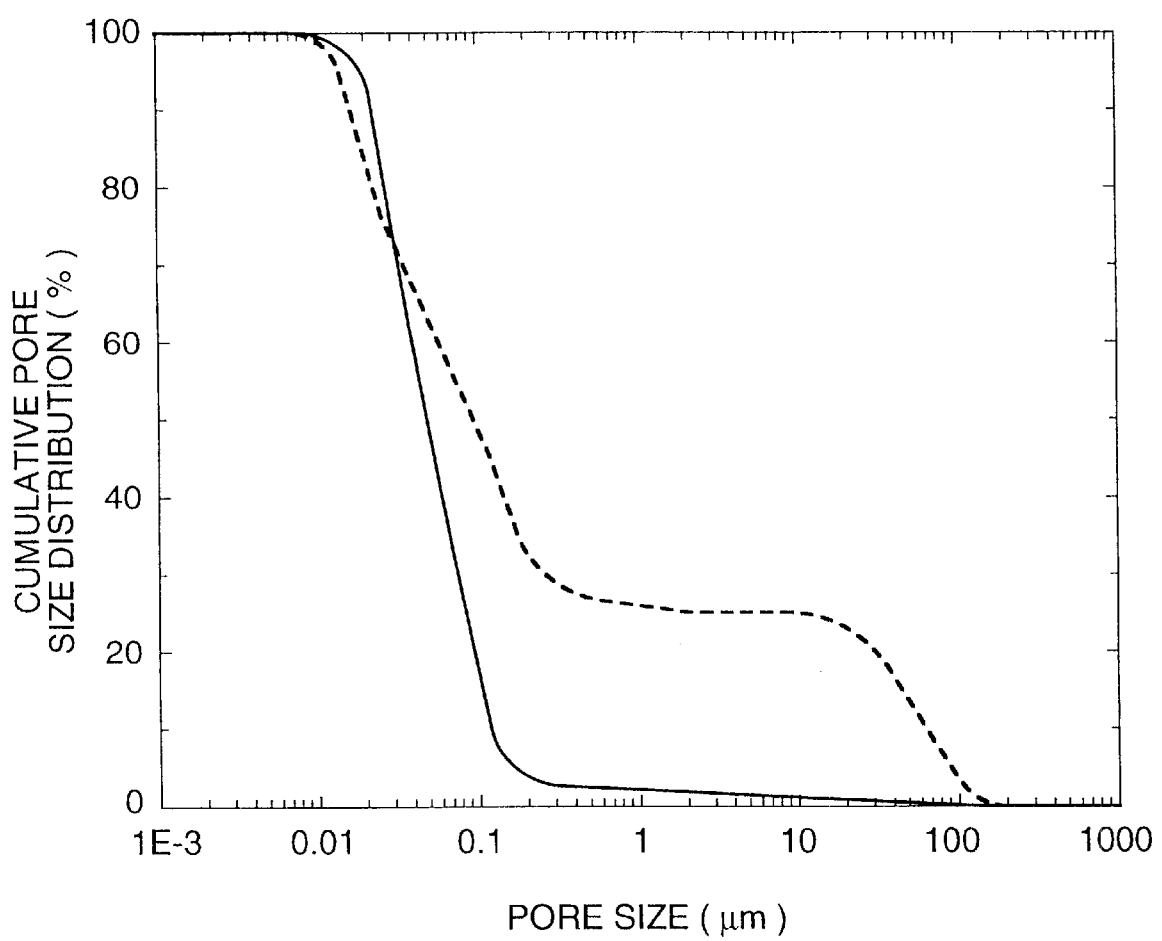
FIG. 5 shows pore size distribution curves of Example 1 and Comparative Example 2 measured by mercury porosimetry wherein the solid curve shows the data of Example 1 while the broken curve shows the data of Comparative Example 2.

Table 4 shows the shrinkage ratios of the sample of Example 2 in the accelerated carbonization test. FIG. 5 shows pore size distribution curves of Example 1 measured by mercury porosimetry.

Comparative Example 1

Figure 3B:
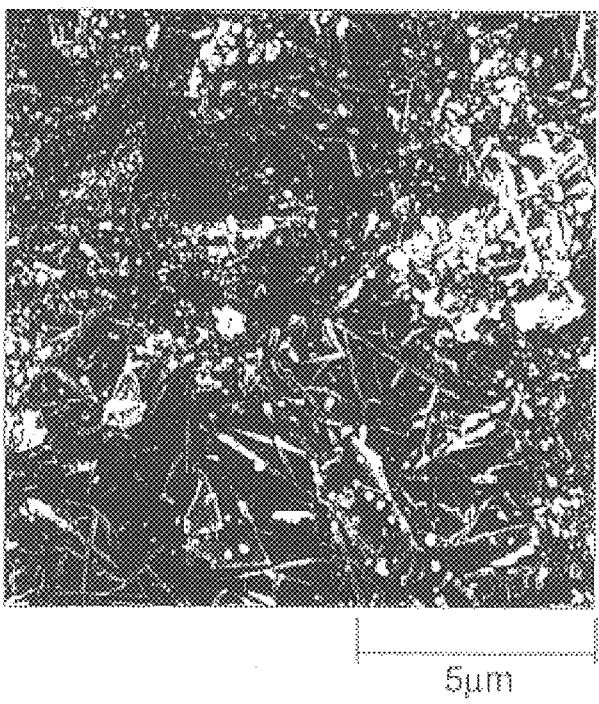
FIG. 3B is a scanning electron microscopic photograph of Comparative Example 1.
Figure 4A:
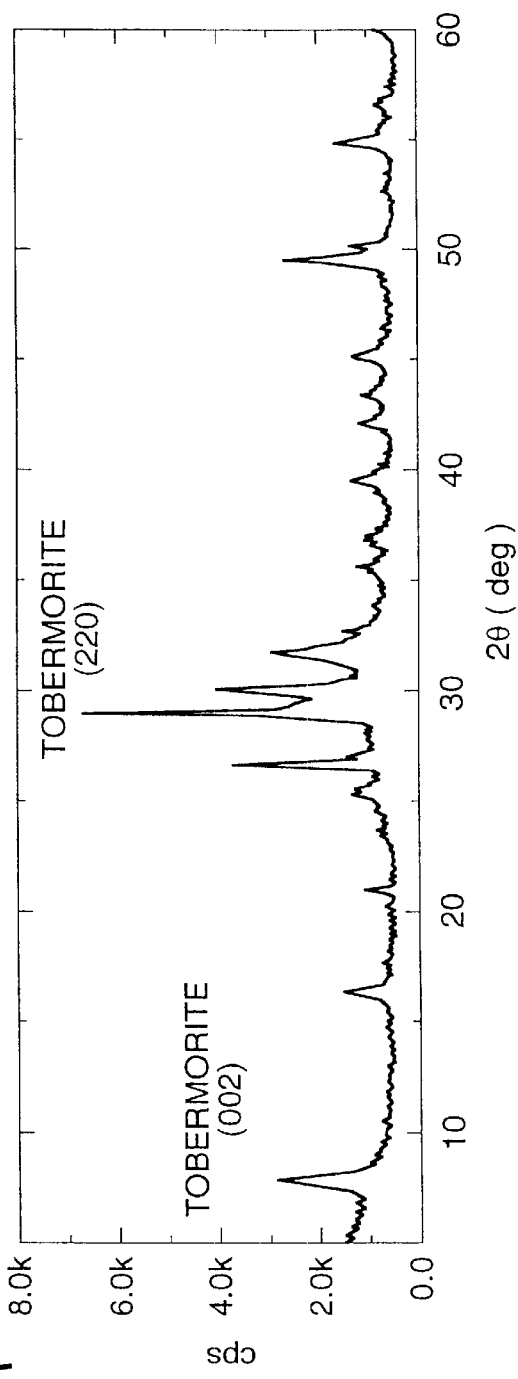
FIG. 4A is a powdery X-ray diffraction pattern of Example 1.
Figure 4B:
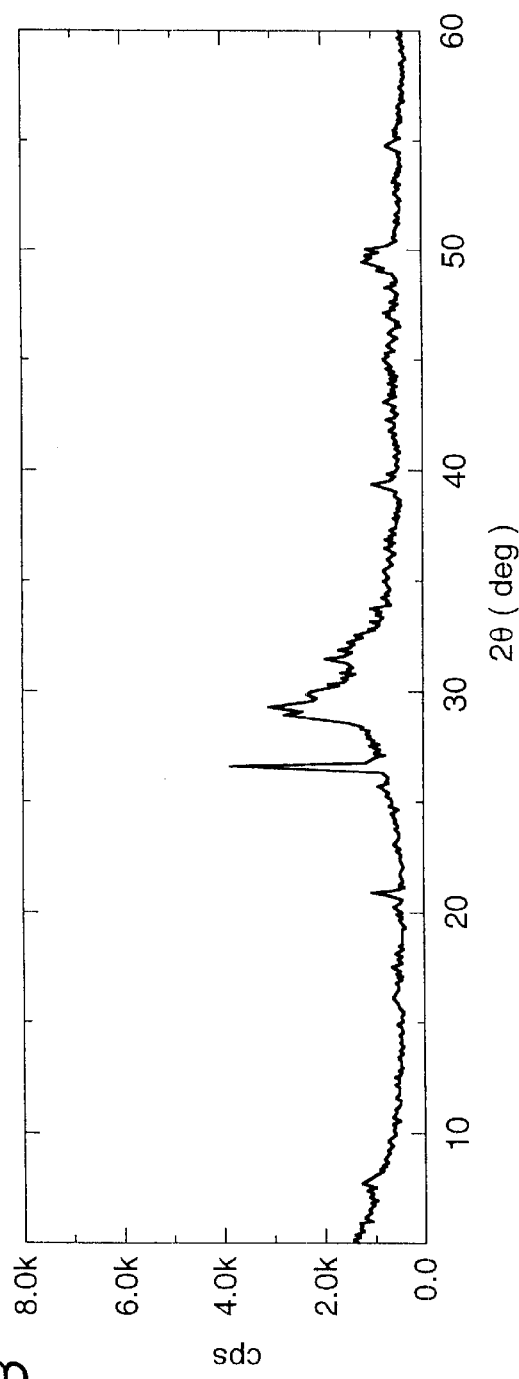
FIG. 4B is a powdery X-ray diffraction pattern of Comparative Example 1.

Components of the primary material were mixed at a composition ratio as listed in Table 1 by using a stirrer at 60° C. The obtained slurry was poured into a formwork and then preliminarily hardened by maintaining at 60° C. for 8 hours. After taking out from the formwork, it was cured in an autoclave at a high temperature of 180° C. under a high pressure for 4 hours and then dried to give a hardened material. Table 2 shows various physical properties of this hardened material. The silicate material employed herein was ground silica as in Example 1. As the results of powdery X-ray diffractometry, a quartz (101) diffraction peak and a diffraction peak at 29.2° seemingly assignable to CSH were observed as peaks higher than the tobermorite (220) diffraction peak, as shown in FIG. 4. When the section of the hardened material was observed under a scanning electron microscope, it had a structure wherein plate tobermorite crystals were mixed with almost the same amount of a fibrous mineral assumed as CSH, as shown in FIG. 3B. FIG. 5 shows the pore size distribution curve measured by mercury porosimetry.

Comparative Example 2

A portion free from reinforcements was sampled from a commercially available ALC and various properties were measured. Table 2 shows the results thus obtained. When the section of the ALC was observed under a scanning electron microscope, it had a structure wherein strip tobermorite particles were located around large bubbles and plate tobermorite particles were observed as the main component in other parts. As the results of powdery X-ray diffractometry, a quartz (101) diffraction peak alone was observed as a peak higher than the tobermorite (220) diffraction peak. Table 4 shows the shrinkage ratios in the accelerated carbonization test.

Comparative Example 3

A hardened calcium silicate material was obtained as in Example 1 but using active clay (SiO$_2$ content: 79.8%) having a Blaine specific surface area of 11,500 cm$^2$/g as the silicate material in the primary material as shown in Table 1. Table 2 shows various physical properties of this hardened calcium silicate material. When the section of this hardened calcium silicate material was observed under a scanning electron microscope, it had a structure wherein plate tobermorite crystals were mixed with almost the same amount of fibrous particles similar to Examples 1 to 4. As the results of powdery X-ray diffractometry, the most intense ray was identified as the tobermorite (220) diffraction peak. Table 4 shows the shrinkage ratios in the accelerated carbonization test.

Comparative Example 4

0.74 g of quick lime was hydrated with 2.60 kg of warm water at 70° C. to give a slaked lime slurry. After cooling to 32° C., the slurry was mixed with 0.20 kg of diatomaceous earth (325 mesh-pass, SiO$_2$ content: 79.0%) and 0.70 kg of cold water. The water/solid ratio at this point was 3.5. Then the slurry was subjected to gelation at 88° C. for 2 hours. Next, it was immediately cooled to 60° C. and 0.81 kg of ground silica employed in Example 1, 0.11 kg of alkali-resistant glass fiber and 0.11 kg of soft wood virgin pulp were added thereto. After homogeneously mixing in an omni mixer for 2 minutes, the obtained mixture was poured into a mold (inner size: 40 mm×160 mm) and dehydration-molded under a pressure of 12 kgf/cm$^2$. The molded material has a thickness of about 20 mm at this point. Subsequently, it was reacted in an autoclave under saturated vapor pressure at 180° C. for 8 hours and then dried at 105° C. for 24 hours to give a hardened material. Table 1 shows the data calculated again by adjusting the composition ratio as described in Example 1, while Table 2 shows various physical properties of the hardened material obtained above. Compressive strength was determined by bonding two plate pieces (thickness: 20 mm) to each other with an epoxy-based adhesive and using the cubic sample (40 mm×40 mm×40 mm). When the section of this hardened calcium silicate material was observed under a scanning electron microscope, it showed a structure mostly consisting of pulp and glass fiber with little plate crystals. As the results of powdery X-ray diffractometry, the most intense peak was identified as the quartz (101) diffraction peak. Table 4 shows the shrinkage ratios in the accelerated carbonization test.

Comparative Example 5

2.16 kg of water was added to 0.4 kg of the diatomaceous earth used in Comparative Example 4 and 0.32 kg of slaked lime (marketed reagent, purity: 99%) and the mixture was heated to 90° C. and reacted under agitation for 3 hours to give a gel. Then 0.2 kg of ordinary portland cement, 0.2 kg of ground silica employed in Example 1 and 0.016 kg of soft wood pulp were added thereto and mixed. The obtained mixture was poured into a formwork and preliminarily hardened at 40° C. for 8 hours. After taking out from the formwork, it was cured in an autoclave at a high temperature of 180° C. under a high pressure for 8 hours. After drying, a hardened calcium silicate material was obtained. Table 1 shows the data calculated again by adjusting the composition ratio as described in Example 1, while Table 2 shows various physical properties of the hardened material obtained above. When the section of this hardened calcium silicate material was observed under a scanning electron microscope, it showed a structure mostly consisting of amorphous and short-fibrous particles with little plate crystals. As the results of powdery X-ray diffractometry, the most intense peak was identified as the quartz (101) diffraction peak. Table 4 shows the shrinkage ratios in the accelerated carbonization test.

Comparative Example 6

A hardened calcium silicate material was obtained as in Example 1 but varying the composition ratio of the primary material to the secondary material. Table 1 shows the composition ratio, while Table 2 shows various physiological data. When the section of the hardened material was observed under a scanning electron microscope, it had a structure wherein plate tobermorite crystals were mixed with almost the same amount of a fibrous particles similar to Example 1. As the results of powdery X-ray diffractometry, the most intense peak was identified as the tobermorite (220) diffraction peak.

Comparative Example 7

A mixture, which was obtained as in Example but using the composition ratio as listed in Table 1, was casted into a formwork. After aging at 60° C. for 8 hours, a layer composed exclusively. of water was observed at a depth of about ⅕ of the form work on the surface of the preliminarily hardened material. Then the solid part alone was taken out and autoclaved as in Example 1. As a result, a number of cracks were formed on the upper face of the molded material and thus the strength could not be measured.

Comparative Example 8

Various physical properties of a commercially calcium silicate board for flame-resistant coating were measured. Table 2 shows the data thus obtained. Compressive strength was measured as in Comparative Example 4. When analyzed by powdery X-ray diffractometry, the main component was xonotlite.

TABLE 1

(No. 1)

| Component | Example 1 | Example 2 | Example 3 | Example 4 | Example 5 |
|---|---|---|---|---|---|
| Primary material | | | | | |
| Ordinary portland cement (wt. part) | 30 | 30 | 31 | 30 | 31 |
| Quick lime (wt. part) | 41 | 41 | 42 | 41 | 42 |
| Slaked lime (wt. part) | 0 | 0 | 0 | 0 | 0 |
| Crystalline silicate material (type, wt. part) | Silica B 26 | Silica B 26 | Silica B 27 | Silica B 26 | Silica B 27 |
| Amorphous silicate material (type, wt. part) | 0 | 0 | 0 | 0 | 0 |
| Gypsum dihydrate (wt. part) | 3 | 3 | 0 | 3 | 0 |
| Water (wt. part) | 130 | 160 | 160 | 160 | 160 |
| CaO/SiO$_2$ (molar ratio) | 2 | 2 | 2 | 2 | 2 |
| Fiber (type) (wt. part, outer ratio) | 0 | 0 | 0 | 0 | 0 |
| Primary material (involving water) | 50 | 50 | 50 | 50 | 50 |
| Secondary material | | | | | |
| Ordinary portland cement (wt. part) | 10.5 | 10.5 | 13.6 | 10.5 | 10.5 |
| Quick lime (wt. part) | 11.5 | 10.5 | 13.6 | 10.5 | 10.5 |
| Crystalline silicate material (type, wt. part) | Silica B 26.5 | Silica B 26 | Silica B 29.8 | Silica B 26 | Silica B 21 |

TABLE 1 (No. 1)

| Component | Example 1 | Example 2 | Example 3 | Example 4 | Example 5 |
|---|---|---|---|---|---|
| Amorphous silicate material (type, wt. part) | 0 | 0 | 0 | 0 | bentonite 5 |
| Gypsum dihydrate (wt. part) | 1.5 | 3 | 3 | 4 | 3 |
| Water (wt. part) | 100 | 100 | 118 | 120 | 100 |
| Fiber (type) (wt. part, outer ratio) | 0 | MFC 1 | MFC 1 | MFC 3 | RP 1 |
| Total used materials | | | | | |
| Whole water used/Total solid materials (wt. ratio) | 1.8 | 1.9 | 1.9 | 2.1 | 1.9 |
| Amorphous silicate material/total silicate material (wt. %) | 0 | 0 | 0 | 0 | 19 |
| Fiber added/Total solid materials (wt. ratio) | 0 | 1.4 | 1.3 | 4.2 | 1.4 |
| CaO/SiO$_2$ (molar ratio) | 0.96 | 0.92 | 0.92 | 0.92 | 0.94 |

TABLE 1 (No. 2)

| Component | Example 6 | Example 7 | Example 8 | Example 9 |
|---|---|---|---|---|
| Primary material | | | | |
| Ordinary portland cement (wt. part) | 30 | 31 | 38.3 | 31 |
| Quick lime (wt. part) | 33.8 | 42 | 43.2 | 42 |
| Slaked lime (wt. part) | 0 | 0 | 0 | 0 |
| Crystalline silicate material (type, wt. part) | Silica C 26.1 | Silica B 27 | Silica B 4.3 | Silica A 27 |
| Amorphous silicate material (type, wt. part) | fumed silica 10.1 | 0 | fumed silica 14.2 | 0 |
| Gypsum dihydrate (wt. part) | 0 | 0 | 0 | 0 |
| Water (wt. part) | 615 | 160 | 416 | 160 |
| CaO/SiO$_2$ (molar ratio) | 1.29 | 2 | 2.48 | 2 |
| Fiber (type) (wt. part, outer ratio) | 0 | 0 | 0 | 0 |
| Primary material (involving water) | 96.6 | 50 | 89.65 | 50 |
| Secondary material | | | | |
| Ordinary portland cement (wt. part) | 0 | 10.5 | 0 | 8.4 |
| Quick lime (wt. part) | 0 | 10.5 | 0 | 8.4 |
| Crystalline silicate material (type, wt. part) | Silica C 2.63 | Silica B 26 | Silica B 9.15 | Silica A 30.1 |
| Amorphous silicate material (type, wt. part) | 0 | 0 | 0 | 0 |
| Gypsum dihydrate (wt. part) | 0.73 | 3 | 1.2 | 3 |
| Water (wt. part) | 6.3 | 208 | 5.8 | 53.9 |
| Fiber (type) (wt. part, outer ratio) | MFC 1 | MFC 3 | MFC 0.8 | MFC 0.42 |
| Total used materials | | | | |
| Whole water used/Total solid materials (wt. ratio) | 5.0 | 3.3 | 2.7 | 1.2 |
| Amorphous silicate material/total silicate material (wt. %) | 18 | 0 | 19 | 0 |
| Fiber added/Total solid materials (wt. ratio) | 5.6 | 4.2 | 2.8 | 0.6 |
| CaO/SiO$_2$ (molar ratio) | 0.94 | 0.92 | 0.93 | 0.73 |

TABLE 1 (No. 3)

| Component | Comparative Example 1 | Comparative Example 3 | Comparative Example 4 |
|---|---|---|---|
| Primary material | | | |
| Ordinary portland cement (wt. part) | 26 | 30 | 0 |
| Quick lime (wt. part) | 32 | 38 | 79 |
| Slaked lime (wt. part) | 0 | 0 | 0 |
| Crystalline silicate material (type, wt. part) | Silica B 39 | 0 | 0 |
| Amorphous silicate material (type, wt. part) | 0 | active clay 39 | diatomaceous earth 21 |

TABLE 1-continued (No. 3)

| Component | Comparative Example | | |
|---|---|---|---|
| | 1 | 3 | 4 |
| Gypsum dihydrate (wt. part) | 3 | 3 | 0 |
| Water (wt. part) | 180 | 130 | 351 |
| CaO/SiO$_2$ (molar ratio) | 1.1 | 2 | 4.53 |
| Fiber (type) (wt. part, outer ratio) | MFC 1 | 0 | 0 |
| Primary material (involving water) | 100 | 50 | 84 |
| Secondary material | | | |
| Ordinary portland cement (wt. part) | no | 10.5 | 0 |
| Quick lime (wt. part) | | 11.5 | 0 |
| Crystalline silicate material (type, wt. part) | | Silica B 26.5 | Silica A 16 |
| Amorphous silicate material (type, wt. part) | | 0 | 0 |
| Gypsum dihydrate (wt. part) | | 1.5 | 0 |
| Water (wt. part) | | 100 | 0 |
| Fiber (type) (wt. part, outer ratio) | | MFC 0.5 | VP + GF 4.36 |
| Total used materials | | | |
| Whole water used/Total solid materials (wt. ratio) | 1.8 | 1.8 | 1.7 |
| Amorphous silicate material/total silicate material (wt. %) | 0 | 22 | 20 |
| Fiber added/Total solid materials (wt. ratio) | 1.0 | 0.7 | 11.2 |
| CaO/SiO$_2$ (molar ratio) | 1.1 | 0.90 | 0.83 |

TABLE 1

(No. 4)

| Component | Comparative Example | | |
|---|---|---|---|
| | 5 | 6 | 7 |
| Primary material | | | |
| Ordinary portland cement (wt. part) | 0 | 31 | 30 |
| Quick lime (wt. part) | 0 | 42 | 33.8 |
| Slaked lime (wt. part) | 44 | 0 | 0 |
| Crystalline silicate material (type, wt. part) | 0 | Silica B 27 | Silica C 26.1 |
| Amorphous silicate material (type, wt. part) | diatomaceous earth 56 | 0 | fumed silica 10.1 |
| Gypsum dihydrate (wt. part) | 0 | 0 | 0 |
| Water (wt. part) | 300 | 160 | 700 |
| CaO/SiO$_2$ (molar ratio) | 0.75 | 2 | 1.29 |
| Fiber (type) (wt. part, outer ratio) | 0 | 0 | 0 |
| Primary material (involving water) | 88 | 50 | 96.6 |
| Secondary material | | | |
| Ordinary portland cement (wt. part) | 6 | 10.5 | 0 |
| Quick lime (wt. part) | 0 | 10.5 | 0 |
| Crystalline silicate material (type, wt. part) | Silica A 6 | Silica B 196 | Silica C 2.63 |
| Amorphous silicate material (type, wt. part) | 0 | bentonite 7 | 0 |
| Gypsum dihydrate (wt. part) | 0 | 3 | 0.73 |
| Water (wt. part) | 0 | 100 | 6.3 |
| Fiber (type) (wt. part, outer ratio) | VP 0.49 | RP 1 | MFC 1 |
| Total used materials | | | |
| Whole water used/Total solid materials (wt. ratio) | 1.9 | 1.9 | 5.5 |
| Amorphous silicate material/total silicate material (wt. %) | 67 | 29 | 18 |
| Fiber added/Total solid materials (wt. ratio) | 1.4 | 1.4 | 6.1 |
| CaO/SiO$_2$ (molar ratio) | 0.71 | 0.95 | 0.90 |

TABLE 2 (NO. 1)

| | Example | | | | | | | | |
|---|---|---|---|---|---|---|---|---|---|
| | 1 | 2 | 3 | 4 | 5 | 6 | 7 | 8 | 9 |
| Specific gravity | 0.55 | 0.51 | 0.52 | 0.47 | 0.52 | 0.22 | 0.28 | 0.37 | 0.69 |
| Bubbles ($\geq 200$ μm)/10 mm × 10 mm | $\leq 20$ | $\leq 20$ | $\leq 20$ | $\leq 20$ | $\leq 20$ | $\leq 20$ | $\leq 20$ | $\leq 20$ | $\leq 20$ |
| Ib/Ia in X-ray diffractometry | 3.35 | 6.11 | 7.12 | 4.77 | 3.38 | 3.45 | 6.06 | 3.56 | 5.49 |
| Specific surface area (m$^2$/g) | 55.1 | 50.0 | 42.7 | 39.5 | 53.8 | 59.0 | 45.9 | 55.2 | 48.8 |
| Tobermorite I(002)/I(200) in X-ray diffractometry | 0.32 | 0.26 | 0.32 | 0.36 | 0.32 | 0.25 | 0.53 | 0.22 | 0.37 |
| Pores ($\geq 1$ μ) in mercury porosimetry (vol %) | 2.2 | 3.9 | 5.0 | 5.5 | 6.4 | 13.2 | 7.9 | 7.0 | 2.5 |
| Pores ($\geq 0.1$ μ) in mercury porosimetry (vol %) | 18.6 | 32.5 | 37.1 | 39.5 | 37.6 | 82.6 | 80.1 | 49.0 | 14.8 |
| Flexural strength (MPa) | 2.72 | 3.80 | 3.49 | 2.31 | 2.31 | 0.65 | 0.95 | 1.75 | 5.0 |
| Compressive strength (MPa) | 12.8 | 15.5 | 10.8 | 12.5 | 12.1 | 1.28 | 2.9 | 5.6 | 19.0 |
| Surface condition (naked eye) | good | good | good | good | good | good | good | good | good |
| Sawing properties: | | | | | | | | | |
| Cutting (naked eye) | good | good | good | good | good | good | good | good | good |
| Section (naked eye) | good | good | good | good | good | good | good | good | good |

TABLE 2 (NO. 2)

| | Comparative Example | | | | | | |
|---|---|---|---|---|---|---|---|
| | 1 | 2 | 3 | 4 | 5 | 6 | 8 |
| Specific gravity | 0.54 | 0.51 | 0.56 | 0.68 | 0.44 | 0.47 | 0.28 |
| Bubbles ($\geq 200$ μm)/10 mm × 10 mm | $\leq 20$ | many | $\leq 20$ | $\leq 20$ | $\leq 20$ | $\leq 20$ | $\leq 20$ |
| Ib/Ia in X-ray diffractometry | 1.32 | 5.04 | 2.69 | 1.24 | 2.93 | 2.84 | no tobermorite |
| Specific surface area (m$^2$/g) | 77.0 | 28.3 | 64.2 | 38.3 | 99.8 | 69.9 | 45.9 |
| Tobermorite I(002)/I(200) in X-ray diffractometry | 0.19 | 0.49 | 0.42 | 0.18 | 0.40 | 0.27 | no tobermorite |
| Pores ($\geq 1$ μ) in mercury porosimetry (vol %) | 2.9 | 26.0 | 3.9 | 17.7 | 7.6 | 12.2 | 22.2 |
| Pores ($\geq 0.1$ μ) in mercury porosimetry (vol %) | 28.5 | 48.5 | 22.6 | 38.1 | 50.3 | 44.4 | 97.5 |
| Flexural strength (MPa) | 1.03 | 1.70 | 2.51 | 4.20 | 0.37 | 1.31 | 2.1 |
| Compressive strength (MPa) | 5.1 | 4.6 | 12.0 | 13.9 | 4.9 | 10.5 | 2.6 |

TABLE 2 (NO. 2)-continued

| | Comparative Example | | | | | | |
|---|---|---|---|---|---|---|---|
| | 1 | 2 | 3 | 4 | 5 | 6 | 8 |
| Surface condition (naked eye) Sawing properties: | white spot | rough | good | good | good | good | dust fall-off, rough |
| Cutting (naked eye) | good | somewhat hard | good | somewhat hard | good | good | good |
| Section (naked eye) | good | fine cut-out | good | good | dust fall-out | good | dust fall-out |

TABLE 3

| | Silica | |
|---|---|---|
| | Blaine specific surface area (cm²/g) | Average particle size (μm) measured by laser diffraction particle size distribution meter |
| Silica A | 7600 | 3.95 |
| Silica B | 11200 | 2.41 |
| Silica C | 24800 | 1.03 |

TABLE 4

| | Carbonization | | | | |
|---|---|---|---|---|---|
| Accelerated carbonization | Example | Comparative Example | | | |
| test | 2 | 2 | 3 | 4 | 5 |
| Shrinkage ratio (%) on day 14 | 0.04 | 0.05 | 0.15 | 0.25 | 0.28 |
| Shrinkage ratio (%) on day 28 | 0.165 | 0.188 | 0.370 | 0.488 | 0.511 |

Industrial Applicability

The high-strength hardened calcium silicate material according to the invention is incombustible and lightweight and yet has a high compressive strength and a high flexural strength. Moreover, it is excellent in the surface appearance and processability. In addition, it has a remarkably high durability typified by the shrinkage ratio at carbonization. Accordingly, the hardened calcium silicate material of the invention is appropriately usable as an exterior wall material, an interior wall material and a floor material for various buildings.

What is claimed is:

1. A hardened calcium silicate material having:

Ib and Ia, wherein a ratio of Ib to Ia is greater than 3; and a specific gravity of 0.2 or more but less than 0.7, the hardened calcium silicate material being substantially free from bubbles having a maximum diameter which is greater than 200 nm, wherein among pores measured by mercury porosimetry, the ratio of pores having a pore size of 1.0 μm or more is from 1% by volume to 15% by volume, wherein Ib represents a diffraction peak intensity of a tobermorite (220) plane in powdery X-ray diffractometry; and Ia represents a minimum diffraction intensity in an angle region located between two diffraction peaks in tobermorite (220) and (222) planes.

2. The hardened calcium silicate material as claimed in claim 1 wherein the specific surface area measured by the nitrogen adsorption method is 60 m²/g or less.

3. The hardened calcium silicate material as claimed in claim 1 wherein, among tobermorite diffraction peaks observed in powdery X-ray diffractometry, a ratio of a diffraction peak intensity I(002) of a (002) plane to the diffraction peak intensity I(220) of the (220) plane is 0.22 or more.

4. A process for producing the hardened calcium silicate material as claimed in any of claims 1 to 3 comprising:

mixing a primary material and a second material in a slurry state, wherein the primary material is obtained by mixing a silicate material, a lime material and water at 40° C. or above in amounts effective to give a CaO/SiO₂ molar ratio of from 1.2 to 2.5, and the secondary material contains at least one of a silicate material and a lime material or at least one of a silicate material and a lime material together with water, as the main component, in amounts effective to give a CaO/SiO₂ molar ratio after mixing of from 0.6 to 1.5, a weight ratio of water to the total solid weight of from 1.0 to 5.0, and an amorphous silicate material content in the silicate materials of less than 20% by weight;

preliminary hardening the obtained slurry at 40° C. or above; and curing in an autoclave at 160° C. or above.

5. The hardened calcium silicate material as claimed in claim 2 wherein among tobermorite diffraction peaks observed in powdery X-ray diffractometry, a ratio of a diffraction peak intensity I(002) of a (002) plane to the diffraction peak intensity I(220) of the (220) place is 0.22 or more.

* * * * *